(12) United States Patent
Lindoff et al.

(10) Patent No.: US 10,200,082 B2
(45) Date of Patent: Feb. 5, 2019

(54) METHODS, DEVICES AND SYSTEMS FOR PROCESSING A SIGNAL IN THE PRESENCE OF NARROWBAND INTERFERENCE

(75) Inventors: Bengt Lindoff, Bjärred (SE); Anders Rosenqvist, Lund (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 578 days.

(21) Appl. No.: 12/866,431

(22) PCT Filed: Feb. 5, 2009

(86) PCT No.: PCT/EP2009/051309
§ 371 (c)(1),
(2), (4) Date: Dec. 9, 2010

(87) PCT Pub. No.: WO2009/101024
PCT Pub. Date: Aug. 20, 2009

(65) Prior Publication Data
US 2011/0085629 A1    Apr. 14, 2011

Related U.S. Application Data

(60) Provisional application No. 61/029,747, filed on Feb. 19, 2008.

(30) Foreign Application Priority Data

Feb. 15, 2008  (EP) .................................... 08151532

(51) Int. Cl.
*H04B 1/71*    (2011.01)

(52) U.S. Cl.
CPC ... *H04B 1/71* (2013.01); *H04B 2201/709709* (2013.01)

(58) Field of Classification Search
USPC .................................. 375/229–236, 346–350
See application file for complete search history.

(56) References Cited

U.S. PATENT DOCUMENTS

| | | |
|---|---|---|
| 6,774,857 B2 | 8/2004 | Frank |
| 6,862,441 B2 | 3/2005 | Ella |

(Continued)

FOREIGN PATENT DOCUMENTS

| | | |
|---|---|---|
| CN | 1323465 A | 11/2001 |
| CN | 1339198 A | 3/2002 |

(Continued)

OTHER PUBLICATIONS

European Search Report, completed Oct. 9, 2008, in connection with European Patent Application No. 08151532.2.

(Continued)

*Primary Examiner* — Curtis Odom
(74) *Attorney, Agent, or Firm* — Leffler Intellectual Property Law, PLLC

(57) ABSTRACT

A method is disclosed for processing a received signal in the presence of an interference of a first type within the bandwidth of a desired signal of the received signal. The method comprises filtering the received signal using at least a first filter having at least a first filter characteristic to produce a filtered signal wherein the interference of the first type is suppressed. Furthermore, the method comprises determining a desired data stream from the filtered signal, basing the determination at least on the first filter characteristic. A method is also disclosed for processing a signal where the method comprises receiving an indication of whether interference of a first type is present in a frequency interval within the bandwidth of the signal, filtering the signal using at least a first filter having at least a first filter characteristic to produce a filtered signal wherein the filtered signal is suppressed in the frequency interval; and transmitting the (Continued)

filtered signal. Corresponding devices, systems and computer program products are also disclosed.

17 Claims, 3 Drawing Sheets

(56) References Cited

U.S. PATENT DOCUMENTS

| | | | |
|---|---|---|---|
| 7,016,439 B2* | 3/2006 | Nuutinen et al. | 375/346 |
| 7,116,958 B1 | 10/2006 | Brown et al. | |
| 7,215,700 B2 | 5/2007 | Currivan et al. | |
| 7,218,694 B2 | 5/2007 | Kolze et al. | |
| 7,221,958 B2 | 5/2007 | Fulghum et al. | |
| 7,280,811 B2 | 10/2007 | Sugiyama et al. | |
| 2002/0196876 A1 | 12/2002 | Takada | |
| 2003/0109277 A1 | 6/2003 | Fulghum et al. | |
| 2005/0190867 A1 | 9/2005 | Sobchak et al. | |
| 2005/0201447 A1 | 9/2005 | Cairns et al. | |
| 2006/0268963 A1* | 11/2006 | Yoshida | 375/148 |
| 2007/0153878 A1 | 7/2007 | Filipovic | |
| 2008/0070510 A1* | 3/2008 | Doppler et al. | 455/69 |
| 2008/0084940 A1* | 4/2008 | Hou | 375/260 |
| 2009/0131123 A1* | 5/2009 | Coersmeier | H04B 1/1036 455/574 |
| 2009/0279710 A1* | 11/2009 | Onishi et al. | 381/71.4 |

FOREIGN PATENT DOCUMENTS

| | | |
|---|---|---|
| CN | 1493120 A | 4/2004 |
| EP | 1 662 672 A2 | 5/2006 |
| WO | 2006002677 A1 | 1/2006 |
| WO | 2007039557 A1 | 4/2007 |
| WO | 20071039557 A1 | 4/2007 |
| WO | 2007/063528 A2 | 6/2007 |

OTHER PUBLICATIONS

PCT International Search Report, dated Jul. 8, 2009, in connection with International Application No. PCT/EP2009/051309.

Cairns, D. et al. "Low complexity parameter estimation for the generalized rake receiver" The 3rd IEEE Signal Processing Education Workshop, 2004, Taos Ski Valley, New Mexico, USA Aug. 1-4, 2004, Piscataway, NJ, USA, IEEE, pp. 191-195, XP010806726, ISBN: 978-0/7803-8434-7.

Chinese Office Action, dated Dec. 27, 2012, in connection with counterpart Chinese Patent Application No. 200980114198.3 (see translation below) (all pages).

Translation of Chinese Office Action, dated Dec. 27, 2012, in connection with counterpart Chinese Patent Application No. 200980114198.3 (all pages).

Chinese Search Report, dated Nov. 28, 2012, in connection with counterpart Chinese Patent Application No. 200980114198.3 (see translation below) (all pages).

Translation of Chinese Search Report, dated Nov. 28, 2012, in connection with counterpart Chinese Patent Application No. 200980114198.3 (all pages).

Korean Office Action, dated Feb. 11, 2015, in connection with counterpart Korean Patent Application No. 10-2010-7020664 (see translation below), all pages.

Translation of Korean Office Action, dated Feb. 11, 2015, in connection with counterpart Korean Patent Application No. 10-2010-7020664, all pages.

H. Kikuchi et al., Spectrum Efficiency of a TDMA/W-CDMA Frequency Sharing System with Notch Filters and Signal Clippers, IEEE 2002 International Conference on Communications, Circuits and Systems and West Sino Expositions, 2002 pp. 192-196, vol. 1.

Laster, J et al. "Interference rejection in digital wireless communications". Signal Processing Magazine, IEEE. vol. 14, No. 3, 1997 pp. 37-62.

Poor, H. "Active interference suppression in CDMA overlay systems". IEEE Journal on Selected Areas in Communications. vol. 19, No. 1, 2001, pp. 4-20.

* cited by examiner

METHODS, DEVICES AND SYSTEMS FOR PROCESSING A SIGNAL IN THE PRESENCE OF NARROWBAND INTERFERENCE

CROSS-REFERENCE TO RELATED APPLICATIONS

This application claims priority under 35 U.S.C. §119 to European Patent Application No. 08151532.2, filed Feb. 15, 2008, which is hereby incorporated herein by reference in its entirety. This application also claims the benefit of U.S. Provisional Application No. 61/029,747 filed Feb. 19, 2008, which is hereby incorporated herein by reference in its entirety.

TECHNICAL FIELD

The present invention relates generally to the field of processing a signal of a communication system. More particularly, it relates to processing a signal in the presence of narrowband interference.

BACKGROUND

In the following description of the invention, problems and solutions will be described in relation to broadband signaling in the presence of one or more narrowband interferers. To simplify and clarify the description, WCDMA (Wideband Code Division Multiple Access) and HSPA (High Speed Packet Access) will be used as an example broadband signaling and GSM (Global System for Mobile communication) will be used as an example narrowband signaling. However, embodiments of the invention are applicable also to other cases of broadband signaling in the presence of one or more narrowband interferers. Examples of broadband signaling are WCDMA, UMTS LTE (Universal Mobile Telecommunications System Long Term Evolution) and UMTS LTE Advanced. Examples of narrowband interferers are GSM and EDGE (Enhanced Data rates for GSM Evolution).

High data rate cellular systems, such as UMTS (Universal Mobile Telecommunications System) or UMTS LTE (UMTS Long Term Evolution) employing techniques such as WCDMA and HSPA, may be introduced in spectrum, which is also used by GSM systems.

WCDMA/HSPA systems are designed to use a bandwidth of 5 MHz or a multiple of 5 MHz. Operators running GSM-networks may not have at their disposal such bandwidths of free spectrum for operating WCDMA/HSPA. Hence, a GSM-operator expanding its business to WCDMA/HSPA-networks may have to either completely abandon its GSM operation, which has obvious disadvantages from a business perspective, or try to apply WCDMA/HSPA operation in the same or overlapping spectrum as GSM operation.

In a migration scenario from GSM to WCDMA/HSPA, an operator may want to allocate as small bandwidth as possible to WCDMA/HSPA. One reason might be that the operator does not want to reduce the capacity of the GSM operation too much. The theoretical maximum bandwidth of WCDMA/HSPA may be derived through studying the pulse shaping for WCDMA/HSPA. The theoretical maximum bandwidth is 4.7 MHz (with reference made to 3GPP specification TS25.101, 3.84 *1.22=4.7) if the 5 MHz version of WCDMA/HSPA is considered. Since the theoretical maximum bandwidth is less than 5 MHz, it might occur to operators to try to squeeze in both the WCDMA/HSPA bandwidth and the GSM bandwidth in, for example, a 5 MHz spectrum.

Furthermore, if relying on that the majority of the information in WCDMA/HSPA is within 3.84 MHz bandwidth (see 3GPP specification TS25.101), an operator might try to put a GSM carrier as close as, for example, 2.2 MHz from the WCDMA/HSPA carrier to optimize the bandwidth utilization. (Placing the GSM carrier 2.4 MHz from the WCDMA/HSPA carrier would work quite easily and the GSM signal would not interfere with the WCDMA/HSPA signal. Since a carrier spacing of 0.2 MHz is applicable in GSM, 2.2 MHz spacing between GSM and WCDMA carriers would be the next obvious alternative to exploit.)

FIG. 1 illustrates an example scenario where the GSM carrier 101 is placed $\Delta f$ MHz from the WCDMA/HSPA carrier $f_c$ 102. As can be seen the GSM signal 103 is within the WCDMA/HSPA bandwidth and will propagate into the WCDMA/HSPA receiver chain, since it is within the bandwidth of a possible WCDMA/HSPA receive (RX) filter passband 105. The GSM signal 103 thus acts as an interferer for the WCDMA/HSPA signaling 104. Hence, there is a risk that the GSM signal (or GSM interferer) 103 blocks or impairs part of the WCDMA/HSPA information signal, which may degrade the reception performance significantly for WCDMA/HSPA.

A straightforward approach to solving this problem is illustrated in FIG. 2 and comprises applying a narrower RX filter 205 to filter out (at least part of) the GSM interferer 103. Such an RX filter would be narrower than the standardized WCDMA/HSPA signal bandwidth. A disadvantage with such a solution is that some of the information in the WCDMA/HSPA signal is lost. This will be the case regardless of the strength of the GSM interferer or even the existence of a GSM interferer. A throughput degradation and capacity loss is thus experienced in the WCDMA/HSPA system.

U.S. Pat. No. 7,221,958 B2 discloses a filtering technique which positions one or more filter nulls substantially at points of narrowband interference in a relatively wideband received signal. The technique may be used for removing adjacent channel interference in a received WCDMA signal caused by GSM radio transmissions. Such operations, however, alter the channel as it is seen by the receiver's signal processing chain subsequent to the filtering. Thus, the performance and accuracy of the subsequent processing is not optimal if such filter nulls are applied.

Hence, there is a need for improved methods, devices and systems for processing a signal in the presence of narrowband interference.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to obviate at least some of the above disadvantages and to provide improved methods, devices and systems for processing a received signal in the presence of narrowband interference.

In a first aspect this is achieved by a method for processing a received signal in the presence of an interference of a first type within the bandwidth of a desired signal of the received signal. The method comprises filtering the received signal using at least a first filter having at least a first filter characteristic to produce a filtered signal, wherein the interference of the first type is suppressed; and determining a desired data stream from the filtered signal. The step of determining the desired data stream from the filtered signal comprises basing the determination at least on the first filter characteristic.

In some embodiments, the method may further comprise detecting whether interference of the first type is present, and in response to detecting that interference of the first type is present, performing said steps of: filtering the received signal using at least the first filter to produce the filtered signal, and determining the desired data stream from the filtered signal based at least on the first filter characteristic.

In some embodiments, the method may further comprise receiving an indicator signal indicative of whether interference of the first type is present, and in response to the indicator signal indicating that interference of the first type is present, performing said steps of: filtering the received signal using at least the first filter to produce the filtered signal, and determining the desired data stream from the filtered signal based at least on the first filter characteristic.

In some embodiments, the indicator signal may be further indicative of a carrier frequency of the interference of the first type.

In some embodiments, the interference of the first type may comprise GSM signalling.

In some embodiments, the step of determining the desired data stream from the filtered signal may comprise calculating weights based at least on the first filter characteristic, and using the calculated weights to combine elements of the filtered signal.

In some embodiments, the step of determining the desired data stream from the filtered signal may comprise applying generalized RAKE receiver calculations to the filtered signal, and the generalized RAKE receiver calculations may be compensated based on the first filter characteristic.

In some embodiments, the first filter may be a notch filter.

In a second aspect, a method is provided for processing a signal. The method comprises receiving an indication of whether interference of a first type is present in a frequency interval within the bandwidth of the signal, filtering the signal using at least a first filter having at least a first filter characteristic to produce a filtered signal wherein the filtered signal is suppressed in the frequency interval and transmitting the filtered signal.

In some embodiments, the method may further comprise receiving the filtered signal and information associated with the at least first filter characteristic, and determining a desired data stream from the filtered signal based at least on the information associated with the at least first filter characteristic.

In a third aspect, a computer program product is provided comprising a computer readable medium, having thereon a computer program comprising program instructions. The computer program is loadable into a data-processing unit and adapted to cause the data-processing unit to execute the method according to the first and/or second aspect when the computer program is run by the data-processing unit.

In a fourth aspect, a receiver is provided for processing a received signal in the presence of an interference of a first type within the bandwidth of a desired signal of the received signal. The receiver comprises at least a first filter having at least a first filter characteristic and adapted to filter the received signal to produce a filtered signal and to suppress the interference of the first type, and a detector adapted to determine a desired data stream from the filtered signal. The detector is adapted to determine a desired data stream from the filtered signal based at least on the first filter characteristic.

In a fifth aspect, a transmitter is provided which is adapted to transmit an indicator signal indicative of whether interference of a first type is present to a receiver according to the fourth aspect.

In a sixth aspect, a communication system is provided which comprises one or more transmitters in accordance with the fifth aspect and suitable to comprise one or more receivers in accordance with the fourth aspect.

In a seventh aspect, a transmitter is provided for processing a signal. The transmitter comprises transmitting circuitry adapted to transmit a filtered signal, circuitry adapted to receive an indication of whether interference of a first type is present in a frequency interval within the bandwidth of the signal, and at least a first filter having at least a first filter characteristic and adapted to filter the signal to produce the filtered signal and to suppress the signal in the frequency interval in response to the indication indicating that interference of the first type is present.

In an eighth aspect, a receiver is provided for processing the filtered signal of the seventh aspect. The receiver comprises receiving circuitry adapted to receive the filtered signal and information associated with the first filter characteristic, and a detector adapted to determine a desired data stream from the filtered signal based at least on the information associated with the first filter characteristic.

In a ninth aspect, a communication system is provided comprising one or more transmitters in accordance with the seventh aspect and suitable to comprise one or more receivers in accordance with the eighth aspect.

In some embodiments, the fourth, fifth, sixth, seventh, eighth and ninth aspects of the invention may additionally have features identical with or corresponding to any of the various features as explained above for the first and second aspects of the invention.

The interference of the first type may be narrowband interference and may originate from one or more narrowband interferers. The one or more narrowband interferers may be transmitting at the same carrier frequency or at different carrier frequencies and they may use the same or different communication standards (or they may even be interferers that are not transmitting according to a communication standard at all, such as a device which comprises an oscillator but is not compliant with Electro Magnetic Compatibility regulations). Narrowband is defined in relation to the bandwidth of the desired signal and is thus defined as a bandwidth that is affecting only a part of the spectrum of the desired signal. In some embodiments, narrowband might be defined as having a bandwidth much less than the bandwidth of the desired signal, such as, for example, $1/10^{th}$, $1/20^{th}$, $1/50^{th}$ or $1/100^{th}$ of the bandwidth of the desired signal.

One of the advantages of embodiments of the invention is that it will be possible to achieve good throughput and capacity when there are one or more narrowband interferers within the bandwidth of the desired signal. According to embodiments of the invention potential narrowband (e.g. GSM) interferers are removed in a way that negatively affects the throughput and capacity as little as possible.

Another advantage of embodiments of the invention is that the performance and accuracy of the processing of the received signal is improved when characteristics of the suppressing filter or filters are taken into account in the subsequent processing of the received signal.

A further advantage of embodiments of the invention is that the receiver performance is optimized when one or more narrowband adjacent channel interferers is within the desired signal bandwidth compared to if no measures are taken to suppress the interferers and compared to if the interferers are suppressed by filtering (for example, by a narrowband receiver filter, where narrowband may be defined as explained above).

Yet a further advantage of embodiments of the invention is that it may be implemented requiring no extra hardware and practically no extra digital signal processing.

BRIEF DESCRIPTION OF THE DRAWINGS

Further objects, features and advantages of the invention will appear from the following detailed description of embodiments of the invention, with reference being made to the accompanying drawings, in which.

DETAILED DESCRIPTION

Figures 1, 2:
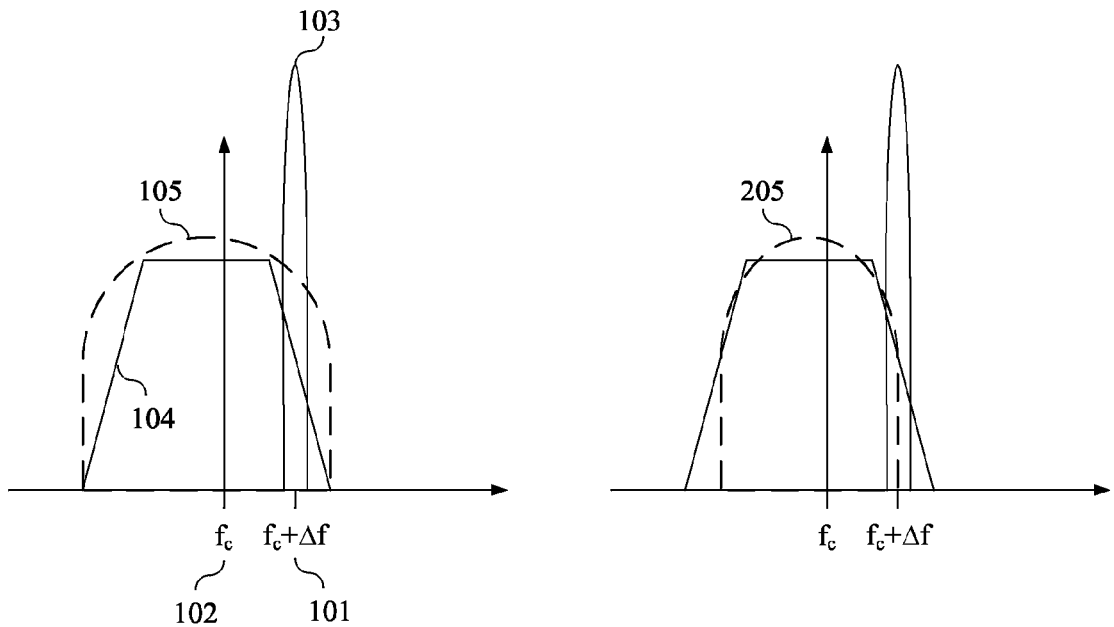
FIG. 1 is a diagram illustrating a received signal in the presence of a narrowband interferer.
FIG. 2 is a diagram illustrating a received signal in the presence of a narrowband interferer.

Embodiments of the invention will now be described in which a UE (User Equipment) determines whether there are any narrowband (e.g. GSM) interferers within the operating spectra of the UE, such as, for example, the bandwidth of a WCDMA/HSPA signal. Embodiments of the invention may also determine the frequency offset from the WCDMA/HSPA carrier to the narrowband interferer and use a filter to suppress or remove the narrowband interferer. According to some embodiments of the invention, some or all of the filter characteristics are used later in the receiver processing chain to compensate for the effect of the filtering.

In some embodiments, a UE is adapted to receive and detect a desired signal. An interfering signal may or may not be present within the bandwidth of the desired signal. The UE may have a signal processing chain, which employs a method for suppressing the interfering signal if it is present.

The method may comprise acquiring interferer indication information either as system information signaled from the transmitting base station or as a control signal from an interference detector in the UE, or as a combination of both.

The method may further comprise receiving the desired signal and the interfering signal and applying a filter in the UE signal processing chain to suppress the interfering signal. The filter may be a notch filter having notch filter data based upon the interferer indication. The notch filter may have a simple structure and may be integrated in the channel filter of the UE. Such a solution has the advantage that it requires no extra hardware and practically no extra digital signal processing. An example of a notch filter having such a simple structure is a filter with integer weights [2 0 0 1 1], which has a notch at 2.2 MHz when the sample rate is 4.3.84 MHz. Alternatively, the notch filter may be implemented as a separate filter. The notch filter may have a notch in the frequency band of the desired signal and may therefore attenuate also the desired signal at some frequencies. Alternatively, an ideal notch filter with center frequency at the interferer's center (carrier) frequency might be used. Yet alternatively, another filter structure may be used which attenuates the signal at the frequencies where the interferer is and otherwise does not alter the desired signal.

The method may also comprise detecting the desired data stream from the filtered signal using knowledge of the filter. The knowledge is used to make it possible to (at least partly) compensate for the effects of the attenuation of the desired signal caused by the notch in the filtering step.

It is possible to detect the desired data stream without using knowledge of the filter and try to otherwise compensate for the effects of the filter on the desired signal. Typically, this will result in a performance loss due to estimation noise caused by additional detector parameters.

In a UE employing a weight calculation algorithm as part of the detecting step of the signal processing chain, at least parts of the notch filter data may be used when calculating combining weight data. The combining weight data may then be used for detecting the desired signal.

In some embodiments of the invention the UE determines, by means of detection, if narrowband interference is present and the carrier frequency or frequencies of such interference. In some embodiments, the detection may be performed by analysis of the received spectrum. Under ideal conditions, the received spectrum is equivalent to the WCDMA/HSPA signaling (see e.g. 104 in FIG. 1). When the radio channel presents fading conditions, there are more or less pronounced dips in the spectrum. A narrowband interferer will appear as a peak in the spectrum. Spectrum analysis can, for example, be made with a set of filter banks (with different frequencies) or Fast Fourier Transforms. Paragraphs [0020] to [0022] of US 2005/0190867 describe example sets of such filter banks.

In some embodiments, the UE receives an indication from the network (via a base station) that there is a risk of narrowband interference and possibly the carrier frequency or frequencies where such interference may be present. In the latter case, the UE only has to scan the indicated frequency or frequencies to detect whether narrowband interference is present or not.

In yet some embodiments, the network might signal whether or not there actually is narrowband interference present and the carrier frequency or frequencies of such interference. In those embodiments no detection by the UE would be necessary.

The network may also signal other information regarding the interference to the UE. Such information may include the interference bandwidth, strength, etc.

The information that is signaled from the network to the UE according to some embodiments may, for example, be included in IRAT (Inter Ratio Access Technology) messages (messages sent in RRC (Radio Resource Control) messages and used by the UE to determine which other RATs (Radio Access Technologies) and which other carrier frequencies it has the possibility to do handover to).

If it is determined that there is a GSM interferer carrier adjacent to the WCDMA carrier (separated by $\Delta f$ Hz) and within the desired WCDMA signal bandwidth, then the UE may apply a notch filter to filter out (or suppress) the GSM interferer according to some embodiments of the invention. The notch filter may be integral to the RX filter of the receiver chain in the UE or it may be separate from the RX filter.

If it is determined that there is no GSM interferer within the desired WCDMA signal bandwidth, then the UE applies a customary RX filter according to embodiments of the invention. Thus, the adjacent narrowband interference suppression may be adaptive.

In some embodiments of the invention, the UE compensates for the known notch filter in the detection step of the receiver processing chain in order to optimize reception performance. For instance, if the detector comprises a G-RAKE detector, the notch filter signal model may be included in the derivations of the noise/interference covariance. Similarly, if the detector comprises a chip equalizer, the notch filter signal model may be included in the calculation of the chip equalizer coefficients.

Figure 3:
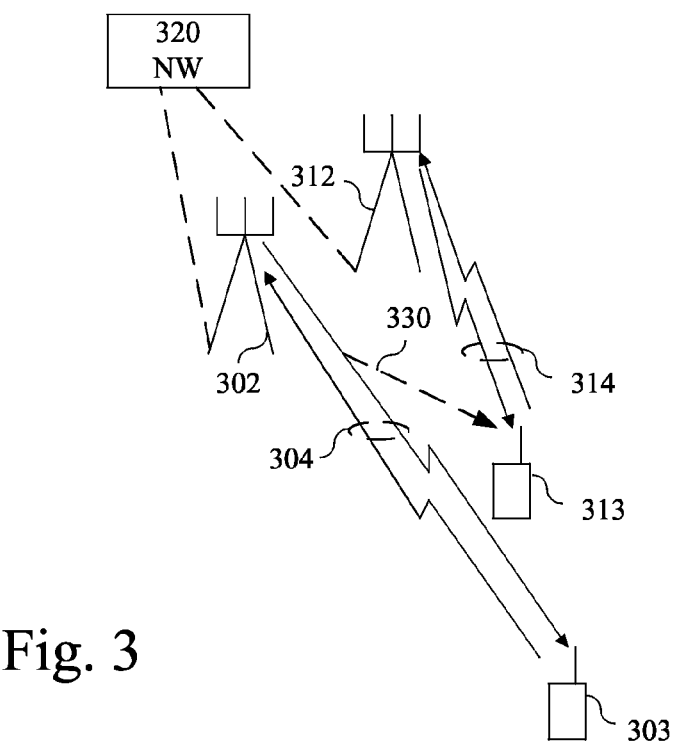
FIG. 3 is a schematic diagram illustrating an example scenario where there is a GSM/EDGE interferer adjacent to and within the WCDMA/HSPA signal bandwidth.

FIG. 3 shows an example scenario where there is a GSM/EDGE interferer adjacent to and within the WCDMA/HSPA signal bandwidth. A GSM/EDGE base station 302 and a GSM/EDGE UE 303 communicate with each other through one or more radio links 304. Similarly, a WCDMA/HSPA base station 312 and a WCDMA/HSPA UE 313 communicate with each other through one or more radio links 314. Both base stations 302 and 312 are connected to a telecommunication network 320. Since, in this case, the operator operates both the GSM/EDGE system and the WCDMA/HSPA system, the WCDMA/HSPA system could be given information regarding the interference 330 caused by the GSM/EDGE communication.

This may be implemented by having the (backbone) network 320 send indication information to WCDMA/HSPA cell sites 312 when there are GSM/EDGE interferers close to the WCDMA/HSPA carrier. This may, for example, be set up at the cell planning stage. Then, for WCDMA/HSPA sites 312 where there is a risk for such adjacent channel interference scenarios, information to that end may be included in, for example, call setup messages, handover messages or IRAT messages. That is, when a UE 313 is connecting to the WCDMA/HSPA cell 312 the UE could receive indication information that there might be a risk of presence of a GSM/EDGE interferer at a frequency of $f_c+\Delta f$ MHz, which might be within the WCDMA/HSPA signal bandwidth. That indication information may then be utilized by the UE 313 in the reception and decoding processing of the WCDMA/HSPA signal to suppress or remove the GSM/EDGE interference. According to some embodiments, the suppression or removal is performed with a limited impact on the signal reception quality.

Figure 4:
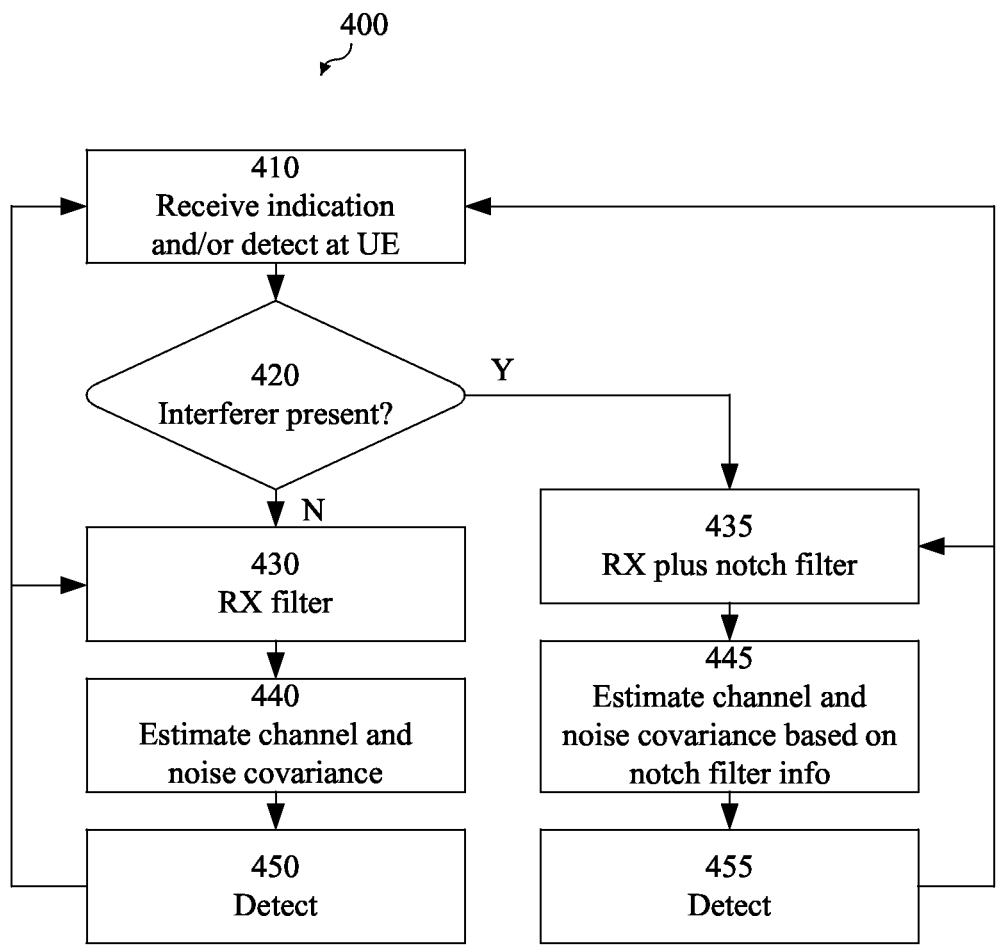
FIG. 4 is a flow chart illustrating example method steps according to some embodiments of the invention.

FIG. 4 is a flowchart illustrating a method 400 according to some embodiments of the invention.

The method starts in step 410, where the UE may receive an indication of potential GSM interference at $f_c+\Delta f$ MHz. As described above, the indication could be signaled from the network (for example, in IRAT messages). The UE may then detect whether or not there actually is GSM interference at $f_c+\Delta f$ MHz. Alternatively, the UE detects (without any signaling from the network) the presence of GSM interference at $f_c+\Delta f$ MHz in step 410. Still alternatively the network may signal an indication of an actual presence of GSM interference at $f_c+\Delta f$ MHz which is received by the UE in step 410. In the latter case, no detection of GSM interference by the UE is necessary. As before, there may be more than one GSM interferer (for example at $f_c+\Delta f_1$, $f_c+\Delta f_2$, and $f_c+\Delta f_3$ MHz) in which case one or more of them may be indicated in step 410 and addressed as described below.

Based on the received indications and/or the determinations by the UE in step 410 it is then determined in step 420 whether or not measures are to be taken to suppress the GSM interference.

If there is no indication of adjacent GSM interferers or if it is determined that no measures shall be taken, for example because the interference is weak, (NO path out of step 420), the UE uses the standard RX filter in step 430 and performs standard channel and noise/interference covariance estimation in step 440. In step 450, signal detection is performed on the filtered signal using the estimates calculated in step 440. A G-RAKE detector, such as a parametric G-RAKE, may be used for signal detection.

If there is an indication of one or more adjacent GSM interferers and if it is determined that measures shall be taken, for example because the interference is strong, (YES path out of step 420), the UE uses an RX filter having a notch at $\Delta f$ MHz in step 435. Alternatively, the UE uses the standard RX filter cascaded with a notch filter having a notch at $\Delta f$ MHz in step 435. Then the UE performs channel and noise/interference covariance estimation where (at least part of) the notch filter characteristics are taken into account in step 445. If a parametric G-RAKE detector is to be used for detection, step 445 may, for example, comprise including the notch filter in the receiver filter model used in the noise/interference covariance signal model. In step 455, signal detection is performed on the filtered signal using the estimates calculated in step 445. As in step 450, a G-RAKE detector, such as a parametric G-RAKE, may be used for signal detection.

After signal detection in either of steps 450 or 455, the process may return to steps 430 and 435 respectively and continue filtering the received signal according the earlier determination in step 420. The process may alternatively return to step 410 for a new detection of GSM interferers. In some embodiments, the process returns to step 410 only at specific moments in time, such as at regular time intervals or at handovers, and returns to steps 430 and 435 respectively in between those specific moments in time.

Figure 5:
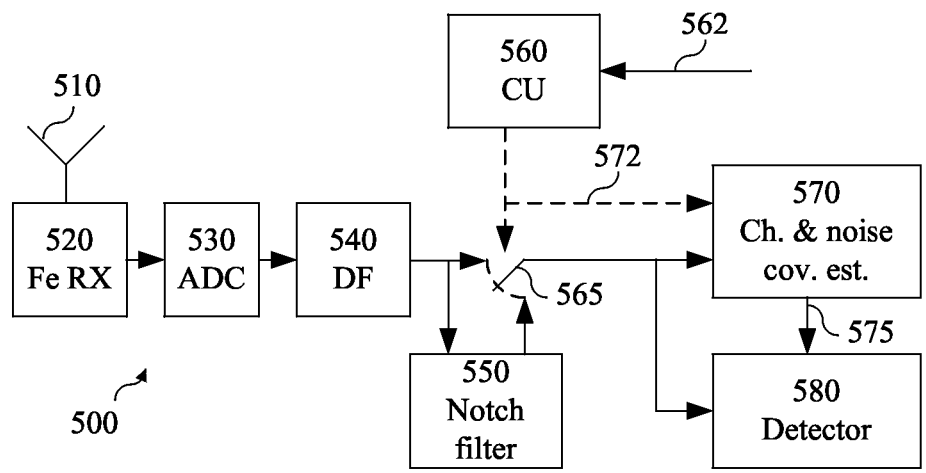
FIG. 5 is a block diagram illustrating parts of a receiver according to some embodiments of the invention.

FIG. 5 is a block diagram illustrating parts of a receiver 500 according to some embodiments of the invention. The receiver 500 may perform method steps such as, for example, those described in connection to FIG. 4.

A radio signal is received through one or more antennas 510 and down-converted to an analog baseband signal in the front-end receiver (Fe RX) 520 and then converted to a digital baseband signal in the analog-to-digital converter (ADC) 530.

The digital baseband signal is then filtered through the RX filter, a digital selectivity filter (DF) 540, which removes out-of-band adjacent interferers. Then, if measures are to be taken to suppress a narrowband interferer at $f_c+\Delta f$ MHz, which is within the signal bandwidth, the received signal is filtered through a notch filter 550 having a notch at $\Delta f$ MHz. If no measures are to be taken to suppress narrowband interferers, the notch filter 550 is bypassed. As described before, there may be more than one interferer at different frequencies, in which case a filter having the appropriate number of notches or several cascaded notch filters are applied in place of filter 550.

To determine if measures are to be taken to suppress one or more narrowband interferers, control unit (CU) 560 receives indication information 562, for instance from an adjacent signal interference detector in the UE (not shown) and/or from network signaling messages (such as IRAT messages). The CU 560 may make a determination regarding if measures are to be taken based on the indication information 562 (taking into account additional indication information like the strength of the interferer), or it may simply relay the indication information 562. In any case, the control unit 560 controls the switch 565, which includes the notch filter in the processing chain or bypasses it.

Information indicating whether or not the notch filter is used (and possibly other information related to the notch filter, such as the frequency Δf, the filter coefficients, etc) is given to a channel and noise/interference covariance estimation unit 570 at 572. The channel and noise/interference covariance estimation unit 570 estimates the noise/interference covariance and the radio channel.

The channel estimates and the noise/interference covariance (or color) estimates both depend on the receiver pulse-shaping filter. In a standard UE for WCDMA, the receiver pulse-shaping filter is more or less the same as the pulse-shaping filter of the transmitting base station. However, when a UE according to an embodiment of the invention is using a notch-filter 550 as part of its signal processing chain, this corresponds to a modified receiver pulse-shaping filter. Thus, information regarding whether the signal is filtered through the notch filter 550 or not can be included in the signal model that is used in 570 for estimating the noise/interference covariance and the channel. Consequently, the channel and noise/interference covariance estimation unit 570 uses the correct receiver pulse-shaping filter when calculating the channel estimates and the noise/interference covariance estimates.

In some embodiments, a detection regarding whether or not GSM interference is present is done in the noise/interference covariance estimation unit 570. In those embodiments, the resulting information may be input to the control unit 560 through a connection between 570 and 560.

In other embodiments, this detection takes place in a narrowband interference detector (not shown) and input to the control unit 560. The narrowband interference detector may be implemented as a separate module or it may be integrated into another module. In some embodiments, the narrowband interference detector is placed before the switch 565 in the signal processing chain. In some embodiments, the narrowband interference detector is placed in parallel to the signal processing chain.

The calculated channel estimates and noise/interference covariance estimates are then fed, at 575, to the detector 580 that detects the received signal based on the adapted signal model. The detector 580 may, for example be a G-RAKE detector. In the detector 580, combining weights may be calculated based on the calculated channel estimates and noise/interference covariance estimates as part of the detection procedure. Information regarding the notch filter 550 may be included in such combining weight calculations.

The notch filter may be implemented in software and/or in firmware, which makes it easier for the UE to respond to adjustments of Δf. However, implementation in hardware may also be considered for some embodiments of the invention. In some embodiments of the invention, the expressions used to calculate the estimates in the channel and noise/interference covariance estimation unit 570 are changed as follows compared to if a standard G-RAKE receiver, such as the one described in US 2005/0201447 A1, was used. The common pulse shape autocorrelation function, $R_p(\tau)$, for a standard G-RAKE receiver should, in these embodiments, be extended to the correlation function of transmitter one (own base station) versus receiver pulse shaping filter, $R_{p,tx1,rx}(\tau)$, the autocorrelation function of the receiver pulse shaping filter, $R_{p,rx,rx}(\tau)$, and the correlation function of transmitter two (adjacent, (interfering WCDMA base station) versus receiver pulse shaping filter, $R_{p,tx2,rx}(\tau)$.

Referring to the equations disclosed in US 2005/0201447 A1, $R_{p,tx1,rx}(\tau)$ should, in these embodiments, be used instead of $R_p(\tau)$ in equations (3) $1^{st}$ part, (12), (13) and (15) $1^{st}$ part, $R_{p,rx,rx}(\tau)$ should be used instead of $R_p(\tau)$ in equations (3) $2^{nd}$ part and (15) $2^{nd}$ part, and $R_{p,tx2,rx}(\tau)$ should be used instead of $R_p(\tau)$ in the equations (25), (25a), (25b), (37) both parts, (38) and (39). Thus, the equations of US 2005/0201447 A1 would be altered as follows (using equation numbers corresponding to those of US 2005/0201447 A1, and the same notation as in US 2005/0201447 A1):

$$R_l(d_1, d_2) = \sum_{l=0}^{L-1}\sum_{q=0}^{L-1} g_l g_q^* \sum_{\substack{m=-\infty \\ m \neq 0}}^{m=\infty} R_{p,tx1,rx}(d_1 - mT_C - \tau_l) R_{p,tx1,rx}^*(d_2 - mT_C - \tau_q), \quad (3)$$

$$R_n(d_1, d_2) = R_{p,rx,rx}(d_1 - d_2)$$

$$\hat{g} = \begin{bmatrix} R_{p,tx1,rx}(\tau_0 - \tau_0) & R_{p,tx1,rx}(\tau_0 - \tau_1) & \cdots & R_{p,tx1,rx}(\tau_0 - \tau_{L-1}) \\ R_{p,tx1,rx}(\tau_1 - \tau_0) & R_{p,tx1,rx}(\tau_1 - \tau_1) & \cdots & R_{p,tx1,rx}(\tau_1 - \tau_{L-1}) \\ \vdots & \vdots & \ddots & \vdots \\ R_{p,tx1,rx}(\tau_{L-1} - \tau_0) & R_{p,tx1,rx}(\tau_{L-1} - \tau_1) & \cdots & R_{p,tx1,rx}(\tau_{L-1} - \tau_{L-1}) \end{bmatrix}^{-1} \hat{h} \quad (12)$$

$$\tilde{h} = \begin{bmatrix} R_{p,tx1,rx}(d_0 - \tau_0) & R_{p,tx1,rx}(d_0 - \tau_1) & \cdots & R_{p,tx1,rx}(d_0 - \tau_{L-1}) \\ R_{p,tx1,rx}(d_1 - \tau_0) & R_{p,tx1,rx}(d_1 - \tau_1) & \cdots & R_{p,tx1,rx}(d_1 - \tau_{L-1}) \\ \vdots & \vdots & \ddots & \vdots \\ R_{p,tx1,rx}(d_K - \tau_0) & R_{p,tx1,rx}(d_K - \tau_1) & \cdots & R_{p,tx1,rx}(d_K - \tau_{L-1}) \end{bmatrix} \hat{g} \quad (13)$$

$$R_l(d_1, d_2) = \sum_{l=0}^{L-1}\sum_{q=0}^{L-1} \hat{g}_l \hat{g}_q^* \sum_{\substack{m=-\infty \\ m \neq 0}}^{m=\infty} R_{p,tx1,rx}(d_1 - mT_C - \tau_l) R_{p,tx1,rx}^*(d_2 - mT_C - \tau_q), \quad (15)$$

$$R_n(d_1, d_2) = R_{p,rx,rx}(d_1 - d_2)$$

-continued $$R_0(d_1, d_2) = \sum_{l=0}^{L-1} \sum_{q=0}^{L-1} \tilde{g}_l \tilde{g}_q^* \sum_{m=-\infty}^{m=\infty} R_{p,tx2,rx}(d_1 - mT_C - \tilde{\tau}_l) R_{p,tx2,rx}^*(d_2 - mT_C - \tilde{\tau}_q) \quad (25)$$

$$R_0(d_1, d_2) = \sum_{l=0}^{L-1} E[|\tilde{g}_l|^2] \sum_{\substack{m=-\infty \\ m \neq 0}}^{m=\infty} R_{p,tx2,rx}(d_1 - mT_C - \tilde{\tau}_l) R_{p,tx2,rx}^*(d_2 - mT_C - \tilde{\tau}_l) \quad (25a)$$

$$R_0(d_1, d_2) = \sum_{m=-\infty}^{m=\infty} R_{p,tx2,rx}(d_1 - mT_C - \tilde{\tau}_0) R_{p,tx2,rx}^*(d_2 - mT_C - \tilde{\tau}_0) \quad (25b)$$

$$R_{12,l}(d_i, d_j) = \qquad (37)$$

$$\sum_{l=0}^{L-1} \sum_{q=0}^{L-1} g_{1,l} g_{2,q}^* \sum_{m=-\infty}^{m=\infty} R_{p,tx2,rx}(d_i - mT_C - \tau_l) R_{p,tx2,rx}^*(d_j - mT_C - \tau_q),$$

$$R_{12,0}(d_i, d_j) =$$

$$\sum_{l=0}^{L-1} \sum_{q=0}^{L-1} \tilde{g}_{1,l} \tilde{g}_{2,q}^* \sum_{m=-\infty}^{m=\infty} R_{p,tx2,rx}(d_i - mT_C - \tilde{\tau}_l) R_{p,tx2,rx}^*(d_j - mT_C - \tilde{\tau}_q)$$

$$R_{12,0}(d_i, d_j) = \sum_{l=0}^{L-1} E[|\tilde{g}_{1,l}|^2] \sum_{m=-\infty}^{m=\infty} R_{p,tx2,rx}(d_i - mT_C - \tilde{\tau}_l) R_{p,tx2,rx}^*(d_j - mT_C - \tilde{\tau}_l) \quad (38)$$

$$R_{12,0}(d_i, d_j) = \sum_{m=-\infty}^{m=\infty} R_{p,tx2,rx}(d_i - mT_C - \tilde{\tau}_0) R_{p,tx2,rx}^*(d_j - mT_C - \tilde{\tau}_0). \quad (39)$$

In some embodiments of the invention the base station transmitter pulse-shaping filter may be adapted. This adaptation may be implemented as an alternative to or in addition to the embodiments described above. When the WCDMA base station has indications that a GSM interferer is present (as explained above), the transmit (TX) filter in the base station may be narrowed according to these embodiments. The TX filter may be narrowed so that no or little information is transmitted at frequencies that are distorted by the GSM interferer.

Information regarding the adaptation of the TX filter in the base station may either be signaled to the UE or it may not. If the information is signaled to the UE, the UE can adapt the pulse shaping filter model used in the demodulation. This modification may be similar to the modification to account for the notch filter as explained above. In embodiments where a G-RAKE receiver is employed, $R_{p,tx1,rx}(\tau)$ in the demodulation model may thus be modified to account for the adapted TX filter. If information regarding the adaptation of the TX filter is not signaled to the UE, the UE will model the TX filter adaptation as if it was introduced in the radio channel. Hence, the TX filter adaptation will be included in the demodulation model in the channel estimation step.

The described embodiments of the invention and their equivalents may be performed by general-purpose circuits associated with or integral to a receiver, such as digital signal processors (DSP), central processing units (CPU), co-processor units, or by specialized circuits such as for example application-specific integrated circuits (ASIC). All such forms are contemplated to be within the scope of the invention.

The invention may be embodied within an electronic apparatus comprising a receiver having circuitry or performing methods according to any of the embodiments of the invention. The electronic apparatus may, for example, be a portable or handheld mobile radio communication equipment, a mobile radio terminal, a mobile telephone, a pager, a communicator, an electronic organizer, a smartphone, a computer, an embedded drive, a mobile gaming device, or a (wrist) watch. The electronic apparatus may alternatively be a base station in a communication system.

Figure 6:
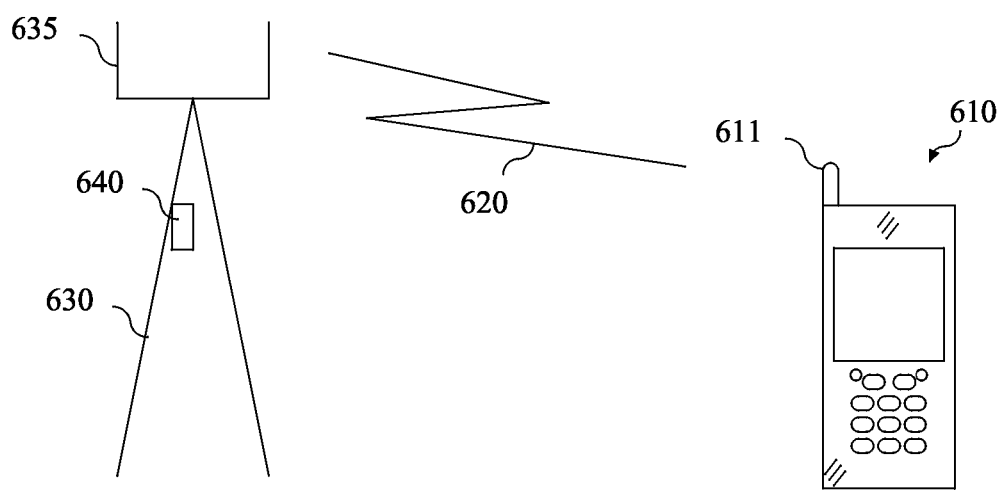
FIG. 6 is a schematic front view of a mobile terminal connected, through a radio link, to a base station site, wherein the mobile terminal and/or the base station may comprise devices according to some embodiments of the invention.

FIG. 6 illustrates an example mobile terminal 610 connected, through a radio link 620, to a base station site 630. The base station site 630 comprises one or more antennas 635 and at least one base station 640. The base station 640 may comprise a transmitter according to embodiments of the invention and the mobile terminal 610 may comprise a receiver according to embodiments of the invention.

The mobile terminal 610 is illustrated as a mobile telephone in a schematic front view. This example mobile terminal 610 comprises an antenna 611 mounted on the housing of the apparatus. Alternatively, the mobile terminal 610 may have an internal antenna mounted within the housing of the apparatus. The mobile terminal 610 may even comprise multiple antennas. The mobile terminal 610 may further comprise a display, a keypad, a loudspeaker, and a microphone, which together provides a man-machine interface for operating the mobile terminal 610.

The example mobile terminal 610 is adapted to connect to a mobile telecommunication network via the wireless link 620 to the radio base station 640. Hence, a user of the mobile terminal 610 may use conventional circuit-switched telecommunication services such as voice calls, data calls, video calls, and fax transmissions, and/or packet-based services such as electronic messaging, VoIP, Internet browsing, electronic commerce, etc. To this end, the mobile terminal 610 and the base station 640 may be compliant with at least one mobile telecommunication standard, for instance UMTS or UMTS LTE. Alternatively or additionally, the mobile terminal 610 may be adapted to connect to one or more digital broadcast systems and to receive signals in accordance with at least one standard for digital broadcast, such as DVB-H.

According to some embodiments of the invention, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in the base station 640 and/or mobile terminal 610. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the methods shown in FIG. 4.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the invention is construed to be limited by the appended claims and all reasonable equivalents thereof.

The invention claimed is:

1. A method for processing a received signal in the presence of an interference of a first type within the bandwidth of a desired signal of the received signal, the method comprising:
    filtering the received signal using at least a first filter having at least a first filter characteristic to produce a filtered signal, wherein the interference of the first type is suppressed; and
    determining a desired data stream from the filtered signal, wherein the step of determining the desired data stream from the filtered signal comprises basing the determination at least on information about the first filter characteristic,
    wherein the first filter is a notch filter.

2. The method of claim 1 further comprising:
    detecting whether interference of the first type is present; and
    in response to detecting that interference of the first type is present, performing said steps of:
        filtering the received signal using at least the first filter to produce the filtered signal; and
        determining the desired data stream from the filtered signal based at least on the information about the first filter characteristic.

3. The method of claim 2, wherein said step of detecting whether interference of the first type is present involves analysing the spectrum of the received signal with respect to a predefined reference spectrum associated with the desired signal.

4. The method of claim 2, wherein said step of detecting whether interference of the first type is present involves receiving an indicator signal indicative of whether interference of the first type is present.

5. The method of claim 4, wherein the indicator signal is further indicative of a carrier frequency of the interference of the first type.

6. The method of claim 4, wherein the indicator signal is received by way of network signalling in a communication system.

7. The method of claim 1, wherein the desired signal comprises WCDMA and/or HSPA signalling and the interference of the first type comprises GSM and/or EDGE signalling.

8. The method of claim 1, wherein the step of determining the desired data stream from the filtered signal comprises calculating weights based at least on the first filter characteristic, and using the calculated weights to combine elements of the filtered signal.

9. The method of claim 1, wherein the step of determining the desired data stream from the filtered signal comprises applying generalized RAKE receiver calculations to the filtered signal, and wherein the generalized RAKE receiver calculations are compensated based on the information about the first filter characteristic.

10. A non-transitory computer readable medium, having stored thereon a computer program comprising program instructions, the computer program being loadable into a data-processing unit and adapted to cause the data-processing unit to execute a method when the computer program is run by the data-processing unit, wherein the method is for processing a received signal in the presence of an interference of a first type within the bandwidth of a desired signal of the received signal, the method comprising:
    filtering the received signal using at least a first filter having at least a first filter characteristic to produce a filtered signal, wherein the interference of the first type is suppressed; and
    determining a desired data stream from the filtered signal, wherein the step of determining the desired data stream from the filtered signal comprises basing the determination at least on information about the first filter characteristic,
    wherein the first filter is a notch filter.

11. A receiver for processing a received signal in the presence of an interference of a first type within the bandwidth of a desired signal of the received signal comprising:
    at least a first filter having at least a first filter characteristic and adapted to filter the received signal to produce a filtered signal and to suppress the interference of the first type; and
    a detector adapted to determine a desired data stream from the filtered signal,
    wherein the detector is adapted to determine a desired data stream from the filtered signal based at least on information about the first filter characteristic,
    wherein the first filter is a notch filter.

12. The receiver of claim 11 further comprising an interference detector adapted to detect whether interference of the first type is present.

13. The receiver of claim 11 further adapted to receive an indicator signal indicative of whether interference of the first type is present.

14. The receiver of claim 13, wherein the indicator signal is further indicative of a carrier frequency of the interference of the first type.

15. The receiver of claim 11, wherein the desired signal comprises WCDMA and/or HSPA signalling and the interference of the first type comprises GSM and/or EDGE signalling.

16. The receiver of claim 11 further comprising weight calculating circuitry adapted to calculate weights based at least on the first filter characteristic, and wherein the detector is further adapted to use the calculated weights to combine elements of the filtered signal.

17. The receiver of claim 11, wherein the detector is a generalized RAKE detector adapted to compensate generalized RAKE calculations based on the information about the first filter characteristic.

* * * * *